(No Model.)
S. J. STEVENS.
THILL COUPLING.
No. 470,903. Patented Mar. 15, 1892.
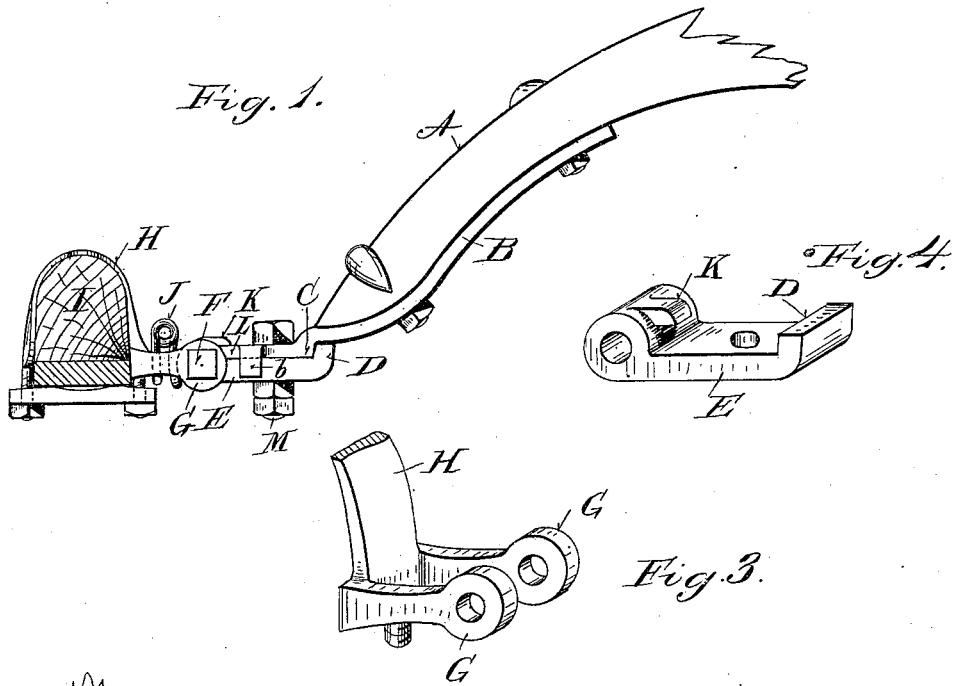
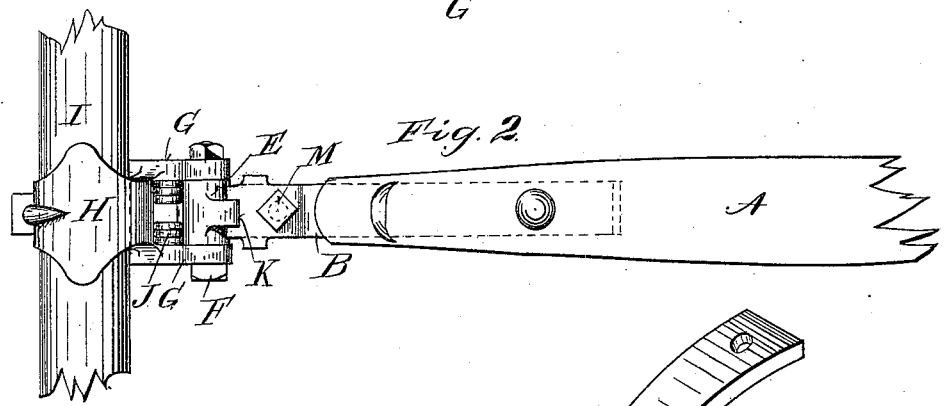
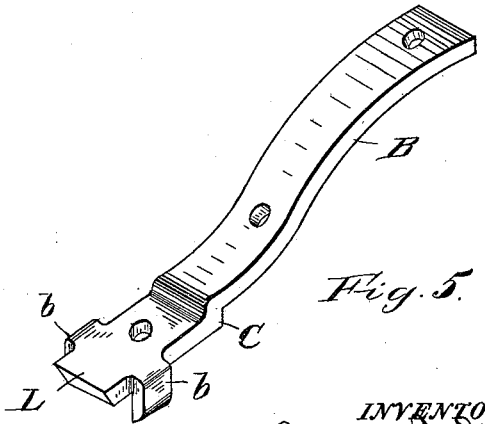
WITNESSES
H. M. Plaisted.
Warren M. McNaw.
INVENTOR
Samuel J. Stevens,
By H. A. Toulmin
his Attorney.

UNITED STATES PATENT OFFICE.

SAMUEL J. STEVENS, OF SPRINGFIELD, OHIO, ASSIGNOR OF ONE-HALF TO D. S. TRIMMER, OF SAME PLACE.

THILL-COUPLING.

SPECIFICATION forming part of Letters Patent No. 470,903, dated March 15, 1892.

Application filed December 7, 1891. Serial No. 414,239. (No model.)

*To all whom it may concern:*

Be it known that I, SAMUEL J. STEVENS, a citizen of the United States, residing at Springfield, in the county of Clark and State of Ohio, have invented certain new and useful Improvements in Draft-Couplings for Vehicles, of which the following is a specification, reference being had therein to the accompanying drawings.

My invention relates to certain new and useful improvements in shaft and pole couplings, the peculiarities of which will be hereinafter fully described in the specification, and particularly pointed out in the claims.

In the many forms of couplings for shafts of carriages or other vehicles in which a spring is used to prevent the joint rattling difficulty is experienced in changing from shafts to a pole on account of the obstruction offered by the spring to placing the holes of the matching parts in line for the connecting-bolt. An additional joint is therefore sometimes made between the eye and the draft pole or shafts in order to keep the spring in constant position and yet allow of changing the draft arrangement. The strain on the joint, however, is such as to cause the connections to work loose in many cases, and in others the arrangement of the parts prevents the ready coupling and uncoupling of the draft-rigging.

It is my object to simplify the construction and increase the efficiency of the joint, so that one man may readily change the arrangement of the draft-rigging from shafts to a pole connection, and which will be simple in construction and strong in connection.

In the accompanying drawings, in which like reference-letters represent corresponding parts, Figure 1 represents a side view of a portion of the draft-rigging with my form of joint connecting it to the axle shown in section; Fig. 2, a plan view of the same; Fig. 3, a detailed perspective view of a portion of the axle-clip; Fig. 4, a similar view of the eye to be mounted in the clip; and Fig. 5, another perspective view of the special form of draft-strap embodying my invention, together with the eye.

The letter A designates one end of the usual form of draft-rigging, which may be through the ordinary shafts or through the pole which is substituted therefor in carriages and like vehicles when it is desired to change the rigging from a one-horse to a two-horse arrangement.

The letter B designates a draft strap or piece bolted to the end of the draft-rigging at the side of the carriage and provided with a projection or shoulder C, adapted to be engaged with a matching projection or turned-out end D of an eye-piece E, pivoted by a bolt F in the lugs G of a clip H, which is secured to an axle I by the usual bolt-and-strap connection. A spring J in convenient form is interposed between the lugs and braced against the eye E to prevent rattling of the joint. A projection K extends outwardly from the top of the eye E and is adapted to hold down the inner end L of the draft-strap B, which is closely fitted under the same, as shown in Fig. 1. A bolt M, provided with the usual jam-nuts, retains the parts in close connection after the engagement of the matching lugs and projections. The lug K takes more or less of the strain from the bolt M and prevents the draft-piece from tipping up at its inner end, while the matching projections or shoulders D and C are kept in close engagement by the bolt M.

The breadth of the draft-strap and eye, as shown from the plan and detail views, affords a rigidity of connection under sidewise strains, while the lugs and matching projections resist the vertical strains on the draft-rigging.

In order to further increase the interlocking engagement of the parts, I provide side lugs b on the draft-strap, which lugs embrace the eye E at the sides or other portion thereof to resist the side strains of the draft-rigging and thus further remove the strain from the bolt M. These side lugs, however, may be omitted, if desired.

It will be seen that by simply removing the bolt M the draft-strap B and the end of the draft-rigging to which it is connected may be removed from the eye E by sliding it out of its interlocking engagement. The coupling on the other side of the carriage may be similarly disconnected and one man may readily change the draft arrangement It will be observed, also, that the position of the lugs and matching parts of the eye and draft-strap affords a rigidity of connection with a simplicity of parts and readiness of disconnection and coupling up which will be fully appreciated by the manufacturer and user.

I do not limit myself to the exact form and construction above illustrated.

Having thus fully described my invention, what I claim as new, and desire to secure by Letters Patent, is—

1. In a draft-coupling, the combination, with an eye having a turned-out end and a lug projecting from one side of said eye toward said end and an axle-support for said eye, of a draft-strap adapted to be connected to one end of a draft-rigging and having side lugs to engage with said eye and matching portions to engage with the turned-out end and projecting lug, respectively, of said eye, and means to hold the parts in their interlocked condition, substantially as shown and described.

2. In a draft-coupling, the combination, with a supporting-clip on the axle of the vehicle, of an eye pivoted in said clip having a turned-up end forming a shoulder and a hole near said end for a fastening-bolt, a draft-strap having a shoulder adapted to engage with said turned-up end of the eye and provided with a corresponding bolt-hole, the distance in the draft-strap from the said shoulder to the center of the hole being the same as in the said eye from the turned-up end to the matching hole, and a bolt to fasten said eye and draft-strap together and maintain the parts in their matched position.

3. In a draft-coupling, the combination, with a supporting-piece from the axle of a vehicle, of an eye carried by said piece and having a shoulder or projection opposite the eye and a projecting lug from the side of the eye, a draft-strap adapted to match and interlock with said shoulder and lug portions of the eye, and means to keep the members in their interlocked condition.

In testimony whereof I affix my signature in presence of two witnesses.

SAMUEL J. STEVENS.

Witnesses:
OLIVER H. MILLER,
WARREN M. MCNAIR.